United States Patent [19]

Bell et al.

[11] Patent Number: 4,610,089
[45] Date of Patent: Sep. 9, 1986

[54] BRIDGE TYPE COORDINATE MEASURING MACHINE

[75] Inventors: Frederick K. Bell; Freddie L. Raleigh, both of Centerville, Ohio

[73] Assignee: The Warner & Swasey Company, Cleveland, Ohio

[21] Appl. No.: 804,942

[22] Filed: Dec. 5, 1985

[51] Int. Cl.⁴ .............................................. G01B 7/28
[52] U.S. Cl. ...................................... 33/1 M; 33/503
[58] Field of Search ............... 33/1 M, 503, 504, 505, 33/DIG. 2

[56] References Cited

U.S. PATENT DOCUMENTS 3,840,993 10/1974 Shelton ................................. 33/1 M
4,551,919 11/1985 Sakata et al. ........................ 33/1 M

FOREIGN PATENT DOCUMENTS 2744687 4/1978 Fed. Rep. of Germany ....... 33/1 M
1599758 10/1981 United Kingdom ................. 33/1 M
684282 9/1979 U.S.S.R. ................................. 33/503

Primary Examiner—Willis Little
Attorney, Agent, or Firm—R. J. Eifler

[57] ABSTRACT

A coordinate measuring machine (CMM) of the type including a bridge (26) supported for horizontal movement on a base (20) that has a table portion (18). The bridge includes cross members (28, 32) that extend above and below the table (18). The bridge (26) supports a probe (12) for vertical movement on a carriage (24) which, in turn, is supported for horizontal movement transversely to the horizontal motion of the bridge (26). The bridge (26) is guided laterally during its movement on the base by means of a rail guide (44) mounted centrally beneath the table (18), and air bearings (48) acting on the guide rail (44). This establishes accurate control over the movement of the bridge (26) on the base (20). Both the table (18) and guide rail (44) are constructed of granite, while the bridge (26) is of aluminum. This arrangement minimizes the effects of thermal expansion between on the components and increases the measuring accuracy of the CMM.

6 Claims, 2 Drawing Figures

BRIDGE TYPE COORDINATE MEASURING MACHINE

This invention relates to a bridge type coordinate measuring machine (CMM) of the type in which a probe is mounted for movement along X, Y, and Z coordinates with means provided for generating an electrical output signal corresponding to the extent of movement along each of the axes, such that by manipulation of the probe along the three axis, dimensions on an object to be measured disposed on the table surface can be performed.

A bridge type coordinate measuring machine includes a vertically movable probe that is mounted on a carriage, which in turn is mounted for movement along a first horizontal axis on a cross member of the bridge. The bridge in turn is mounted for movement along a second horizontal axis orthogonal to the first horizontal axis, over the table portion of the base of the machine. Some bridges are constructed of two vertical members connected together by upper and lower cross members extending above and below the table portion of the base. This creates a closed loop bridge which provides a rigid construction, keeping the deflection of the bridges components to a minimum to insure accuracy of measurement.

The movement of the probe, carriage, and bridge must be orthogonally true in order to insure precise correspondence between the measured probe movement and the actual probe movement, as is well known to those skilled in the art.

Thus, the movement of the bridge on a table base must be precisely orthogonal to the carriage movement throughout its length of travel. Precision control over the movement has heretofore been achieved by a lateral preloading of bearings acting on the table sides.

The guide bearings cooperate with structure on the table portion of the base on which the work piece is supported.

This arrangement necessitates a similar coefficient of thermal expansion of the table portion and the bridge cross members in order to maintain the proper bearing preload through changes in ambient temperatures.

A very advantageous material for the table is granite, since granite is extremely durable, presents an excellent appearance and is relatively low in cost. However, the coefficient of thermal expansion of granite differs substantially from aluminum or steel such that the use of a granite table with a metal ring type bridge and preload lateral bearings would be impractical.

Accordingly, it is an advantage of the present invention to provide a ring type bridge coordinate measuring machine having a table portion constructed of granite with cross members of other dissimilar material, which insures accurate true movement of the bridge on the table base of the machine.

SUMMARY OF THE INVENTION

The invention is a CMM that includes a center located narrow width granite guide rail affixed beneath the granite table extending parallel to the direction of movement of the bridge on the table base. The granite guide rail is engaged laterally by spaced air guide bearings mounted to the center of the bridge cross member passing beneath the table.

Since the granite rail has the same coefficient of thermal expansion as the granite table, and is of a relatively small width, the effects of thermal construction or expansion are minimized, to maintain precise control over movement of the bridge on the table base with normal variations in ambient temperatures.

DETAILED DESCRIPTION OF THE INVENTION

Figure 1:
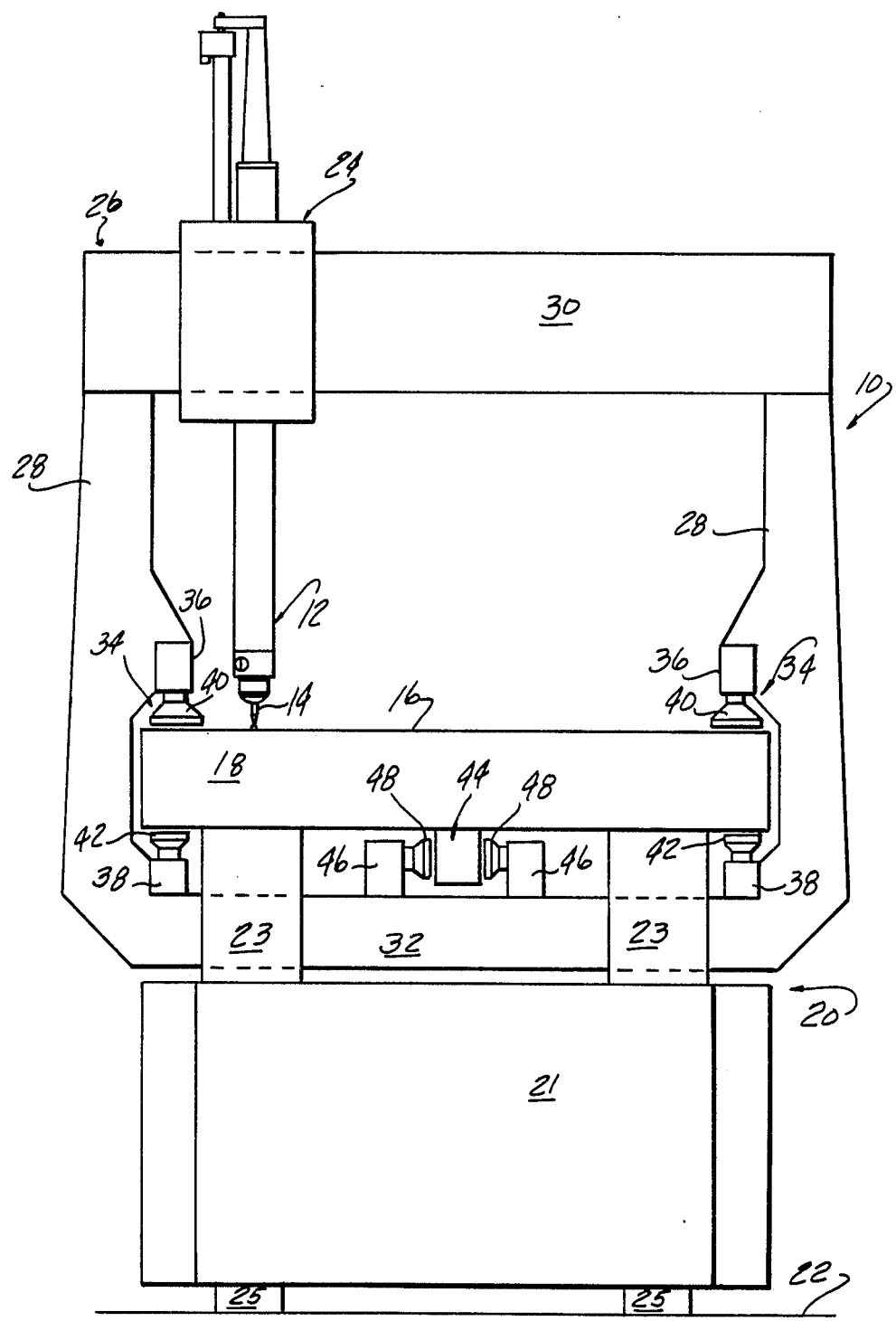
FIG. 1 is an endwise elevational view of a coordinate measuring machine according to the present invention.

Referring now to the drawings, FIG. 1 depicts a coordinate measuring machine 10 in which a probe shaft 12 including a probe tip 14 are mounted for accurately controlled movement along orthogonal axes above the upper surface 16 of a table portion 18 of a table base structure 20. Pads 25 beneath the corners of the generally rectangular table base 20 are adapted to support the coordinate measuring machine 10 on a surface 22.

The table base 20 includes a base portion 21 supporting the table portion 18 on support blocks 23 located at the forward and rear, and on either side of the base 21, to position the table 18 above the base 21 with a space therebetween.

Probe 12 is supported on a carriage 24 so as to be capable of moving vertically thereon, commonly referred to as along the "Z" axis.

The carriage 24 in turn is supported on a bridge 26 which includes a pair of spaced vertical members 28 straddling table 18, located on either side thereof. The upper ends of the vertical members 28 are joined by an upper horizontal cross member 30 extending across and above the table member 18. The lower ends of the vertical members 28 are joined by a lower cross member 32 passing beneath the table portion 18 of the base 20 through the space between the table 18 and the base portion 21.

The carriage 24 is mounted for movement along the upper cross member 30 such as to be able to be moved back and forth in a first horizontal direction, referred to as the "Y" axis with respect to the table surface 16.

The bridge 26 is in turn supported for horizontal movement in a second direction orthogonal to the horizontal movement of the carriage 24 by means of bridge air bearings 34 located alongside of the table portion 18 along the direction of movement of the bridge 26 theron.

Bridge air bearings 34 include upper mounting rail 36 and lower mounting rail 38 on either side of the bridge 26, supporting upper air bearing element 40 and lower air bearing element 42 mounted in opposing pairs located on either side of the bridge.

One of the upper air bearing elements 40 or lower air bearing elements 42 are adjustably mounted in the manner well known to those skilled in the art to create a bearing preload of predetermined magnitude, depending on the clearance gap with the upper and lower surfaces of the table 18. The preload is set to obtain proper stability of the bridge 26 during its movement along the surface 16 of table 18.

Movement along each of the orthogonal X, Y, and Z axes causes electrical signals to be generated and recorded, corresponding to each said movement as by conventional transducer arrangement, such as the Moire fringe devices described in U.S. Pat. Nos. 2,886,717, "Measuring Apparatus", issued May 12, 1959; and 2,886,718, "Measuring Apparatus", issued May 12, 1959.

Thus, by movement of the probe 12, either by means of a power actuator or manually, so as to contact the tip 14 with features on a work piece supported on table 16, distance therebetween may be measured with corresponding electrical signals generated providing measurement data. One example of a prior art CMM's, disclosing the details of the movement and mounting of the probe, may be found in U.S. Pat. No. 3,840,993 entitled "Coordinate Measuring Machine", issued Oct. 15, 1974.

According to the concept of the present invention, the table 18 is constructed of granite material, while the bridge 26 and particularly the first upper cross member 30 and lower cross member 32 are constructed of a light weight metal such as aluminum.

In order to minimize the effects of the difference in thermal coefficient of expansion existing between these diverse materials, an improved lateral guide arrangement for the bridge 26 is provided.

The improved lateral guide arrangement for the bridge 26 includes a central granite rail 44 affixed to the under side of the table portion 18, extending along the length thereof, and along the central axis of the base 20. Positioned closely adjacent the granite rail 44 are a pair of guide air bearings 48 supported on members 46, providing forces in opposite directions on either side of the section of the granite rail 44 disposed therebetween. This provides very accurate control over the movement of the bridge 26 on the support bearings 34. Alternately, the rail 44 could be mounted to the lower portion 21 of the base and air bearings 48 and their support members 46 would be mounted to the underside of the bridge cross member 32.

Figure 2:
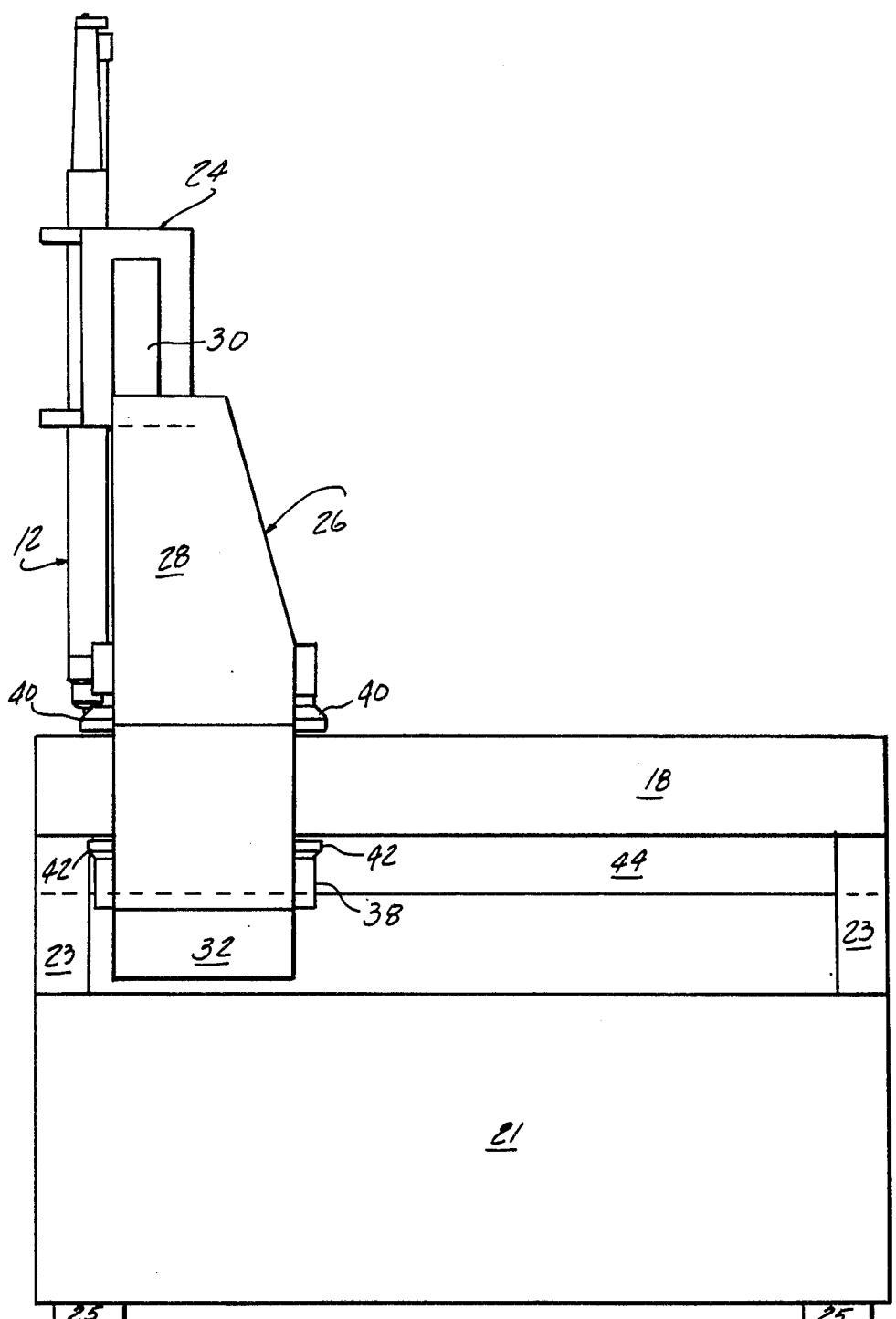
FIG. 2 is a side elevational view of a coordinate measuring machine according to the present invention.

FIG. 2 shows how the guide rail 44 extends beneath the table portion 18 and along the full length of the table 18 in the direction of movement of the bridge 26.

It can also be seen that spaced pairs of upper and lower air bearings 40 and 42 are disposed extending along each side of the granite table base 18 in order to provide bearing support resisting tipping of the bridge 26 as the bridge moves in the direction parallel to the sides of the table base portion 18.

Accordingly, it can be appreciated that the above advantages of the present invention are achieved by the arrangement herein described in that the effect of the difference in thermal expansion and contraction between the gantry and table portion is minimized. This allows the use of diverse material such as the use of granite in the table portion 18 and metal such as aluminum in the bridge construction to achieve maximum performance and minimum cost without adverse effects on accuracy, otherwise encountered for the use of such diverse materials in these components.

We claim:

1. In combination with a coordinate measuring machine (10) of the type including a base (20) having a table portion (18) spaced above a base portion (21); a bridge (26) having a pair of spaced vertical members (28) an upper cross member (30) connecting together said vertical members (28), above said table portion (18), and a lower cross member (32) connecting together said vertical members (28) below said table portion (18); a probe (12); means mounting said probe for horizontal and vertical motion relative to said upper cross member (30); and means (40, 42) for supporting said bridge (26) for movement on said base (20) in a horizontal direction orthogonal to said probe horizontal movement on said bridge (26), the improvement comprising:

a guide rail (44) located along the central axis of said base (20) and parallel to said table portion (18); and means (46, 48), carried by the central section of said lower cross member (32) for acting on said guide rail movement of said guide rail (44) and said bridge (26) on said support means (40, 42) as said bridge moves in the horizontal direction along the central axis of said base (18).

2. The coordinate measuring machine (10) as described in claim 1 wherein said table portion (18) and said guide rail (44) are of the same material, and of material dissimilar from the remaining portions of said base (20) and bridge (26).

3. The coordinate measuring machine (10) as described in claim 2 wherein said table portion (18) and said guide rail (44) are comprised of granite.

4. The coordinate measuring machine (10) as described in claim 3 wherein the width of said guide rail (44) is a small proportion of the width of said table portion (18).

5. The coordinate measuring machine (10) as described in claim 3 wherein said bridge (26) is constructed of aluminum.

6. The coordinate measuring machine as described in claim 1 wherein said guide rail (46) is mounted to the underside of the table portion (18) of said base (20).

* * * * *

UNITED STATES PATENT AND TRADEMARK OFFICE
CERTIFICATE OF CORRECTION

PATENT NO. : 4,610,089
DATED : September 9, 1986
INVENTOR(S) : Bell et al

It is certified that error appears in the above-identified patent and that said Letters Patent is hereby corrected as shown below:

Column 2, line 1, after "thermal" delete "construction" and insert --contraction--.

Column 3, line 6, delete "distance" and insert --distances--.

column 4, line 26, after "rail" insert --to guide--.

Signed and Sealed this

Twelfth Day of June, 1990

Attest:

HARRY F. MANBECK, JR.

*Attesting Officer*     *Commissioner of Patents and Trademarks*